US008437779B2

(12) United States Patent  (10) Patent No.: US 8,437,779 B2
Phukan  (45) Date of Patent: May 7, 2013

(54) MODIFICATION OF DYNAMIC CONTACT LISTS

(75) Inventor: Prasenjit Phukan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 579 days.

(21) Appl. No.: 12/581,761

(22) Filed: Oct. 19, 2009

(65) Prior Publication Data

US 2011/0092227 A1    Apr. 21, 2011

(51) Int. Cl.
*H04W 24/00*    (2009.01)
*H04M 11/04*    (2006.01)

(52) U.S. Cl.
USPC .............. 455/456.3; 455/456.1; 455/456.2; 455/456.4; 455/456.5; 455/456.6; 455/457; 455/404.2

(58) Field of Classification Search .............. 455/404.2, 455/456.1–456.6, 457
See application file for complete search history.

(56) References Cited

U.S. PATENT DOCUMENTS

| | | |
|---|---|---|
| 2005/0114021 A1 | 5/2005 | Krull et al. |
| 2005/0255861 A1* | 11/2005 | Wilson et al. ............. 455/456.2 |
| 2005/0289180 A1 | 12/2005 | Pabla et al. |
| 2008/0071544 A1 | 3/2008 | Beaufays et al. |
| 2008/0133580 A1* | 6/2008 | Wanless et al. ............. 707/102 |
| 2009/0005068 A1* | 1/2009 | Forstall et al. ............. 455/456.1 |
| 2009/0104895 A1 | 4/2009 | Kasturi et al. |
| 2009/0191898 A1* | 7/2009 | Lewis et al. ............. 455/456.3 |
| 2010/0069045 A1* | 3/2010 | Grignani et al. ........... 455/414.1 |
| 2010/0330972 A1* | 12/2010 | Angiolillo ................ 455/418 |

FOREIGN PATENT DOCUMENTS

| | | |
|---|---|---|
| KR | 10-2005-0107671 | 11/2005 |
| KR | 2007082972 A * | 8/2007 |
| KR | 10-2007-0098753 | 10/2007 |

OTHER PUBLICATIONS

Full translation of Seok, Pub. No. KR 2007082972 A.*
International Search Report & Written Opinion for Application No. PCT/US2010/053000, dated Oct. 27, 2011, 9 pages.

* cited by examiner

*Primary Examiner* — Jean Gelin
*Assistant Examiner* — Dung Hong
(74) *Attorney, Agent, or Firm* — Fish & Richardson P.C.

(57) ABSTRACT

In general, the subject matter described in this specification can be embodied in methods, systems and program products for dynamically generating contact list. A computer system identifies a geographic location of a mobile computing device that is associated with a user. A local contact list is generated by selecting, for inclusion in the local contact list, one or more contacts that are from a contact list that is stored for the user and are within a first predetermined geographic location. The local contact list is generated by selecting, for inclusion in the local contact list, one or more contacts that are not in the contact list that is stored for the user and are within a second predetermined geographic location. The local contact list is provided for display on the mobile computing device.

26 Claims, 6 Drawing Sheets

MODIFICATION OF DYNAMIC CONTACT LISTS

TECHNICAL FIELD

This document generally describes techniques, methods, systems, and mechanisms for providing targeted user interface elements to a user of a computing device, such as a smartphone.

BACKGROUND

Mobile computing devices such as smartphones allow their users to take many of the functions from their desktop personal computers on the road with them. Smartphone applications run the gamut, from original personal digital assistant programs such as tasks lists, contact lists, and calendars, to programs that users can add to their telephones from on-line application stores.

Many of these applications focus on "local" aspects of a user's experience because of the portability of smartphones. For example, search engines can determine or infer the location of a mobile device and can return "local" search results that are directed to the area around the device. Also, applications for finding restaurants may be aimed at a user's current location, such as by accessing data from a GPS unit on a mobile device or by using cellular telephone triangulation techniques, among others.

SUMMARY

The present disclosure generally relates to customizing the manner in which a user's various contacts are shown to the user on a mobile computing device as the mobile computing device is moved from one location to another. For example, the user's contacts may be filtered so that only contacts that are within a certain distance of the user are shown in a contact list or in an automatically filtered special contact list. For example, a user could have 1000 acquaintances in a contact list, and their device may allow them to filter the display of those contacts using tags such as "family," "work," "friends," and "clients," or by selecting a choice such as "favorites" (e.g., the ten people the user sends messages to the most) or "local", a list of all the contacts within a set distance of the user. Additional contacts may be added to this "local" contact list even though they are not part of the user's main contact list. Specifically, certain categories of contacts may be added to the user's "local" list and may be dynamically populated with contact records that are relevant to the particular locale. For example, telephone numbers for taxi companies, public transit, restaurants, and emergency services, may be automatically added to the list as soon as a user is registered as appearing in an area. As the user moves (e.g. by flying or driving to a new area), the local contact list may be updated for the user.

In general, the subject matter described in this specification can be embodied in a computer-implemented method for dynamically generating a contact list. A computer system identifies a geographic location of a mobile computing device that is associated with a user. A local contact list is generated by selecting, for inclusion in the local contact list, one or more contacts that are from a contact list that is stored for the user and are within a first predetermined geographic location. The local contact list is generated by selecting, for inclusion in the local contact list, one or more contacts that are not in the contact list that is stored for the user and are within a second predetermined geographic location. The local contact list is provided for display on the mobile computing device.

Another aspect of the subject matter described in this specification can be embodied in a computer-implemented method for dynamically generating contact lists. A computer system identifies a geographic location of a mobile computing device that is associated with a user. A local contact list is generated by selecting one or more contacts from a contact list that is stored for the user. The local contact list is generated by selecting one or more contacts within a geographic area that includes the identified geographic location. The selected one or more contacts within the area are not in the contact list that is stored for the user. The selected one or more contacts from the list stored for the user and the selected one or more contacts within the geographic area are included in the local contact list. The local contact list is provided for display on the mobile computing device.

Another aspect of the subject matter described in this specification can be embodied in a system for dynamically generating contact lists. The system includes a mobile device to receive from a server system contacts associated with an area around a current geographic location of the mobile device and generate a local contact list by adding the contacts associated with the area around the geographic location to a list of contacts that are stored on the mobile device. The system includes a positioning unit in the mobile device to determine the current geographic location of the mobile device and provide information identifying the current geographic location to the server system. The system includes a display device in the mobile device to display the local contact list.

Another aspect of the subject matter described in this specification can be embodied in a system for dynamically generating contact lists. The system can include a mobile device to receive from a server system contacts associated with an area around a current geographic location of the mobile device and generate a local contact list by adding the contacts associated with the area around the geographic location to a list of contacts that are stored on the mobile device. The system can include a positioning unit in the mobile device to determine the current geographic location of the mobile device and provide information identifying the current geographic location to the server system. The system can include a display device in the mobile device to display the local contact list.

These and other implementations can optionally include one or more of the following features. The first and second predetermined geographic regions can be identified as including the geographic location of the mobile computing device. The local contact list can be generated automatically in response to a change in geographic location of the mobile computing device. The local contact list can be generated in response to receiving user-input identifying a projected location of the mobile computing device. The local contact list that is generated in response to the received user-input identifying the projected location can be provided for display on the mobile computing device in response to the geographic location of the mobile computing device being within the projected location.

Code can be provided that permits the user to alternatively select for show the local contact list and the contact list that is stored for the user. The geographic location of the mobile computing device can be determined using a satellite positioning system. The geographic location of the mobile computing device can be determined using a position of wireless communication antennas transmitting information to the mobile computing device. The mobile computing device can perform the identification of the geographic location. The mobile computing device can generate the local contact list. The selected one or more contacts that are not in the contact list can be associated with a category of services selected by a user of the computing device.

One or more contacts can be selected from within a first predetermined location by selecting contacts that include telephone numbers identifying telephones within the first predetermined geographic location. One or more contacts can be selected from within a second predetermined location by selecting contacts that include addresses within the first predetermined geographic location. One or more contacts can be selected from within a second predetermined location by selecting contacts that include telephone numbers identifying telephones within the first predetermined geographic location.

The first predetermined geographic location and the second predetermined geographic location can be approximately equivalent. The first predetermined geographic location or the second predetermined geographic location can be selected by the user. At least one of the contacts selected from the contact list that is stored for the user can be not within the geographic area. User-input identifying an organization for which an associated contact should be included in the local contact list when a local office for the organization is within the geographic area can be received. A contact can be selected for a local office of the organization as within the geographic area and including the selected contact for the local office in the local contact list. User-input can be received that identifies a category of services for which associated contacts should be included in the local contact list when an associated contact is within the geographic are. A contact can be selected that is associated with the category of services and within the geographic area. The selected contact can be included in the local contact list. The selected contacts within the geographic area can be displayed in a different style than a style for the selected contacts from the contact list that is stored for the user.

The list of contacts stored on the mobile device can be selected from a contact list that is stored on the mobile device. The selection can identify contacts that are near to the determined geographic location, and in distinction to contacts from the contact list that are not near to the determined geographic location.

Particular embodiments can be implemented, in certain instances, to realize one or more of the following advantages. A contact list on a mobile device can display contacts for people or places that are near a position of the mobile device ("local contacts"). Displaying local contacts may facilitate a user's retrieval of locally relevant information. Adding contacts from categories of services to a mobile device's main contact list enables a user of the mobile device to access in a single contact list interface his normal contacts and additional contacts that are category and location-specific. Use of a single contact list can save the user time. Including contact records from user-defined categories can help the user quickly access needed services when in an unfamiliar location.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
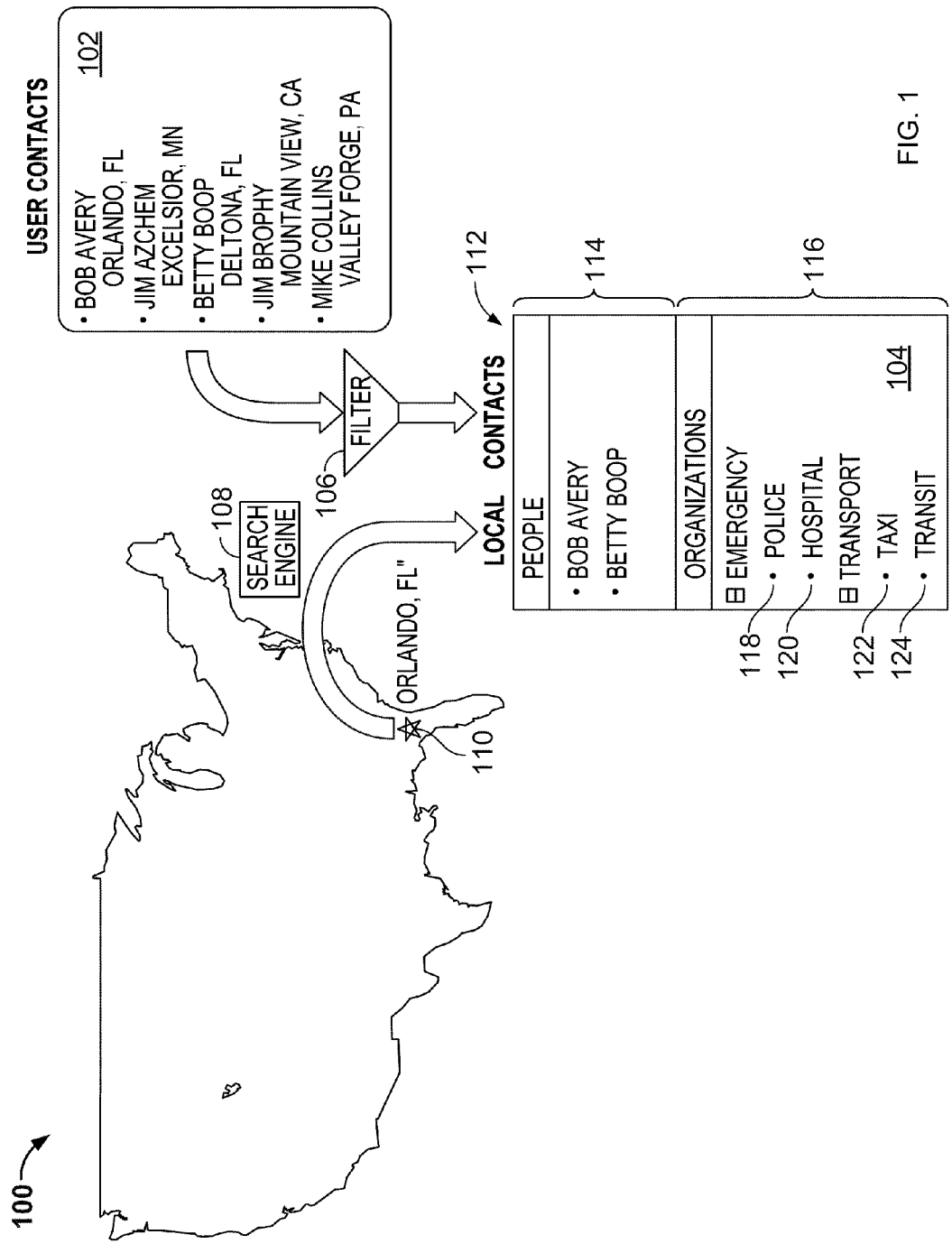
FIG. 1 is a conceptual diagram illustrating the generation of a local contact list.

This document generally describes generating, for a mobile device, a contact list that includes contacts selected by a user of the mobile device and other contacts that are not selected by the user but are local contacts for a user-selected category. As an illustration, a mobile telephone includes a contact list for helping the user quickly contact people and organizations. Many of the contacts in the list may have been entered by the user. Some of the contacts, however, may be added to or removed from the list as the user of the mobile device moves between different geographic locations.

For example, the business person may travel frequently on business and always want his contact list to display local emergency numbers. The contact list on the business person's phone may include a "Police" contact and a "Hospital" contact that are updated with local contact information as the user travels about. In another example, as the user flies to different cities, a "Taxi" contact may update a telephone number to reflect a telephone number for a local taxi company. Additionally, the updated taxi contact may list a location of the local taxi company and an email address for the local taxi company.

As just described, the mobile device may add location-specific contacts for specific categories to the telephone. For example, as the user flies between different cities, local contacts associated with a "Food" category may populate the contact list. The local "Food" contacts may include several different contact records (e.g., a Detroit "Taco Johns" and a Detroit "Pizza Man"). In some examples, the several different contact records are interspersed throughout the contact list, e.g., alphabetically. In other examples, the contact list includes a contact labeled "Food." The several different contact records can be shown as children records next to or below the "Food" contact. In other illustrations, user-selection of the "Food" contact triggers a display of the "Taco Johns" and "Pizza Man" contacts.

Contacts that the user entered into the telephone's "Master Contact List" can be filtered depending on the location of the mobile telephone. For example, the telephone may filter out contacts from the master list that are not associated with the current location of the mobile telephone. The remaining contacts can be displayed with local contacts from a category selected by the user.

Contacts can be associated with a current location of the mobile telephone if an address referenced by the contact is near the current location or if the contact is associated with a device that is near the current location. As an illustration, a mobile telephone user and his friend are both from New York, but are traveling together through California. Even though the friend's contact may reference a New York street address, the contact for the friend may appear in the user's local contact list because the friend's telephone is in California.

The user of the mobile telephone may modify local contact list settings. For example, the user may select categories or organizations of interest to the user. Local contacts relevant to the selected categories or organizations may appear in the contact list. For example, the user may activate a "Taxi" category and "Food" category. Contacts for a taxi company taxi company that services the location of the mobile telephone or food places that are near the location of the telephone may appear in the telephone's contact list.

Local contacts from selected categories can be downloaded after the mobile device appears in a new geographic location or before the mobile device appears in the new geographic location. For example, before travelling to Sweden, a user may select "Currency Exchange" and "US Embassy Contact" categories of interest and further identify "Uppsala, Sweden" as a projected location for travel. The telephone may download appropriate contacts for Uppsala, store them in the mobile telephone, and not display the contacts until the telephone is in or near Uppsala. Downloading the contacts ahead of time enables the user to save money on international data roaming charges for the telephone. In this example, the user has selected a category and a location, but has not specifically selected a particular currency exchange office or US Embassy contact record for inclusion in the contact list.

In some examples, when the telephone identifies that the telephone has been moved to a new location, a prompt appears that asks the user to identify categories of interest to the user. The prompt may also permit the user to activate a location-based filtering of contacts from the master list.

FIG. 1 is a conceptual diagram illustrating the generation of a local contact list. The local contact list 112 includes a list of people 114 that are associated with a geographic location 110 and a list of organizations 116 that are associated with the geographic location 110. The list of people 114 can be filtered 106 from a more complete list of user contacts 102. The more complete list of user contacts includes contacts associated with a variety of different locations. In some implementations, the more complete list of user contacts 102 is user-defined (i.e., each contact in the list has been selected for inclusion in the list by the user). The list of organizational contacts 116 is not drawn from the list of user contacts 102, but is retrieved from a search engine 108 as being associated with both the location 110 and specific categories of services. For example, the search engine 108 provides contacts 118, 120, 122, and 124 that are specific to "Orlando, Fla." for the "Police," "Hospital," "Taxi," and "Transit" categories of services.

Figure 2:
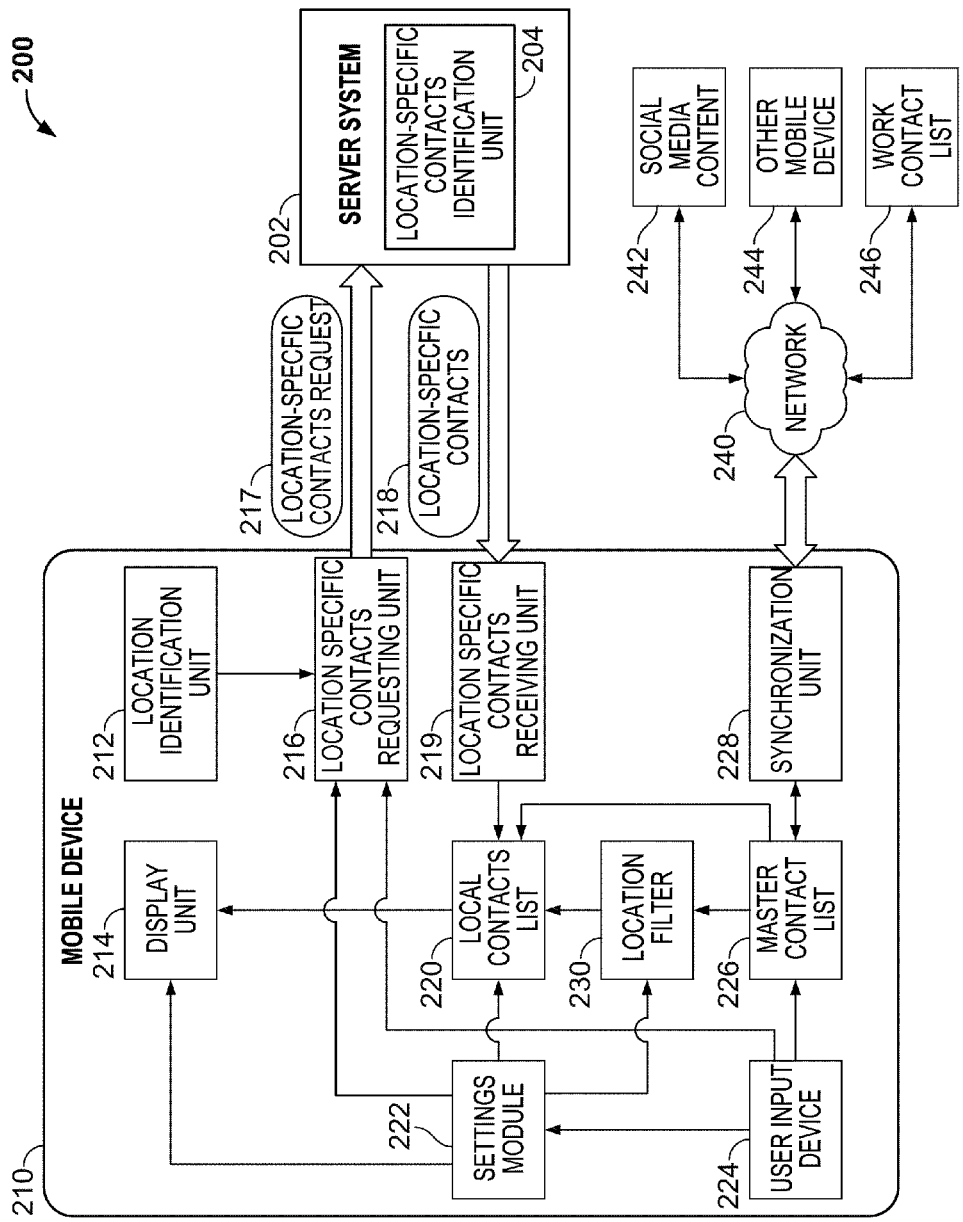
FIG. 2 is a diagram of an example system for modifying a dynamic contact list.
Figure 3:
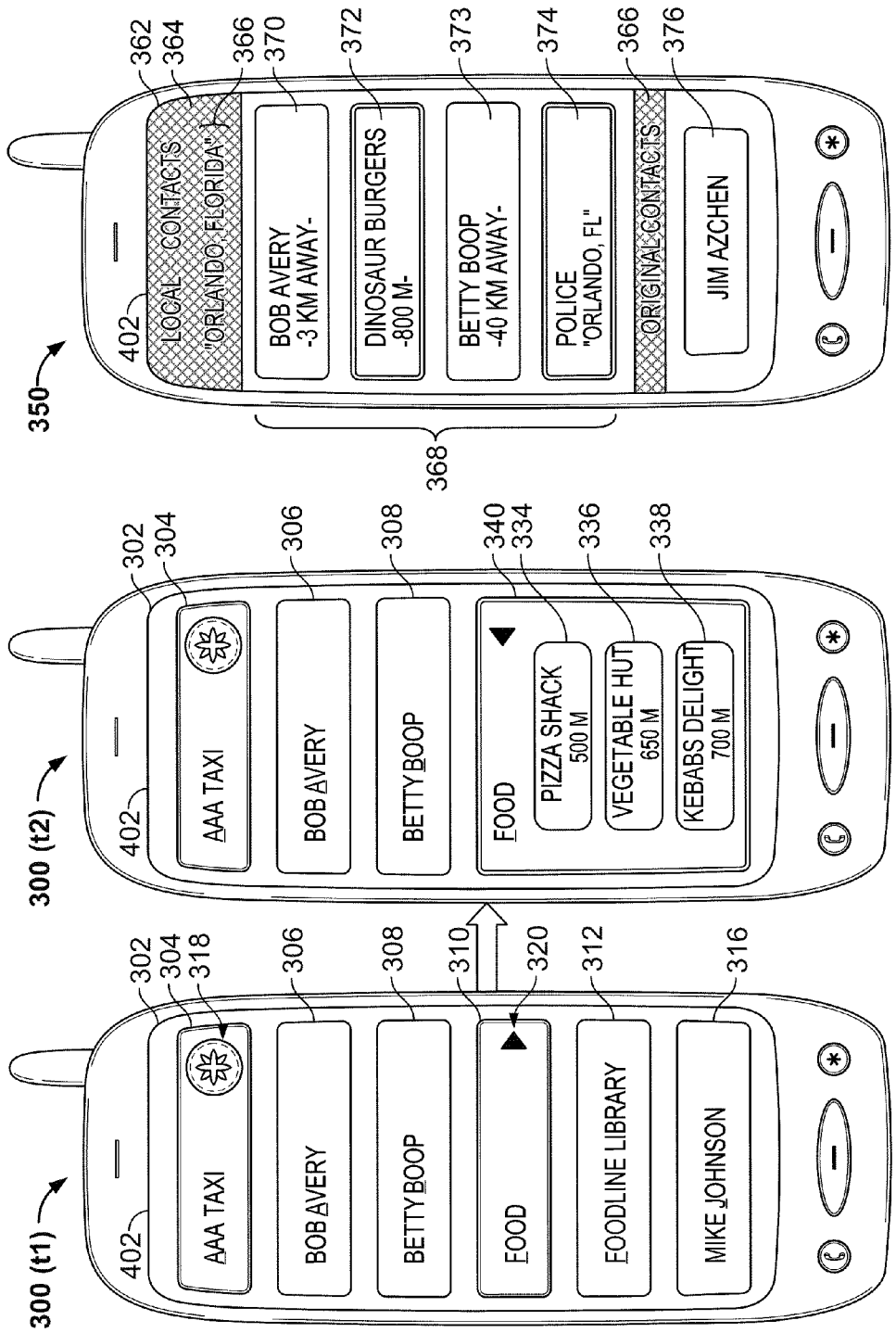
FIGS. 3A-3B are example illustrations of mobile devices displaying portions of local contact lists.

FIG. 2 is a diagram of an example system for modifying a dynamic contact list. The system 200 generates a local contact list 220. The local contacts can be drawn from a master contact list 226 (e.g., contacts that the user has entered into the mobile device 210) and a set of location-specific contacts that are provided by a server system 202. The local contact list 220 is displayed on the mobile device 210 with the display unit 214. The mobile device 210 identifies a location of the mobile device with location identification unit 212 and provides the location to the server system 202. The server system 202 provides the mobile device 210 with location-specific contacts 218.

Contacts stored in the master contact list 226 can be created by a user of the mobile device 210 using the input device 224. The contacts in the master list can be received from or synchronized with other devices. For example, the contacts may be synchronized with contacts from a social media website 242, another mobile device, 244, or a work contact list 246.

The settings module 222 impacts the filtering 230 of contacts from the master list 226 and the types of location-specific contacts that the mobile device 210 requests from the server system 202. At any given time, a user of the mobile device 210 may be able to identify a fixed number of contacts as composing the master contact list 226.

More specifically, the mobile device 210 can be mobile telephone, a laptop computer, a vehicle dashboard computing system, a personal digital assistant, or another portable computing device that can display a list of contacts to a user and determine a location of the computing device. The location identification unit 212 determines a location of the mobile device 210. In some implementations, the location identification unit is a satellite-based positioning system (e.g., a navigation system that receives location information from the Global Positioning System (GPS), Galileo, Beidou, Global Navigation Satellite System (GLONASS), Indian Regional Navigational Satellite System (IRNSS), or Quasi-Zenith Satellite System (QZSS) systems).

In some implementations, the location identification unit 212 determines the position of the mobile computing device 210 based on wireless communication antennas that the mobile device 210 transmits signals to and receives signals from. For example, the identification unit 212 can use triangulation algorithms and information received from the wireless communication antennas to determine an approximate location of the mobile device 220. In another example, communications received by the mobile telephone from a wireless communications tower identifies a location of the wireless communication tower. This information alone can provide a rough location for the mobile device (e.g., a portion of the city around the antenna). In some implementations, a location identification unit is located in the server system 202. In these implementations, the server-side location identification unit may transmit to a location identification unit 212 on the mobile device 210 an approximate location of the mobile device. In some implementations, the server-side location identification unit transmits the mobile device's location to a search engine that returns category-specific contacts to the mobile device.

In the example embodiment shown in FIG. 2, the location-specific contacts requesting unit 216 receives an approximate location of the mobile device from the location identification unit 212 and transmits a request 217 for location-specific contacts to the server system 202. In some implementations, the request 217 includes a category of location-specific contacts. For example, the request can include an organizational name (e.g., Target, Subway, or Conoco), a service category (e.g., taxis, dining places, movie theaters, laundromats, emergency services, or hospitals), or a personal identifier (e.g., a unique identifier that the server system can use to identify previously stored personal preferences).

The location-specific contacts identification unit 204 on the server system 202 receives the location-specific contacts request 217 and provides responsive location-specific contacts 218 to the mobile device 210. In some implementations, the contacts identification unit 204 is a search engine that receives a query that includes a location and additionally query terms. The search engine can provide results that are near the location and associated with the query terms. In another implementation, the contacts identification unit 204 accesses a database of contacts that are each associated with various locations and various categories. In another example, the contacts identification unit 204 queries travel recommendation websites to identify recommendations for businesses that provide a type of service and are near a location.

In addition to the list of location-specific contacts 218, the mobile device 210 also includes a master contact list 226. The master contact list includes the mobile device's native contacts. These contacts may be permanently stored in a memory of the mobile device 210. In some implementations, the user inputs each contact in the master list 226 using the mobile device's input device (e.g., a physical or virtual keyboard). In some implementations, the user selected each contact for inclusion in the master contact list. Each contact in the master list can include a telephone number, street address, or email address. The master contact list 226 can include contacts for individuals and organizations associated with various geographic locations.

In some implementations, the master contact list 226 is synchronized 228 with various contact list content providers 242, 244, and 246 over a network 240. For example, the master contact list 226 on the mobile device 210 can be synched with a list of contacts 246 maintained at an individual's place of employment. If a contact is added to the master contact list 226, the work contact list 246 may be updated to include the contact. Conversely, if a contact is added to the work contact list 246, the master contact list 226 can be updated to include the added contact. Synchronization can be performed with other mobile devices 244 or with social media content 242 (e.g., a contact list associated with a user account on a social network).

The local contact list 220 can include contacts that are associated with a location of the mobile device 210. In some implementations the local contact list includes all contacts from the master contact list and is supplemented with the location-specific contacts 218 provided by the server system 202. For example, the master contact list can include a list of the friends of a user of the mobile device and the location-specific contacts can include the emergency numbers associated with a location of the mobile device 210. In this example, when the mobile device is in Chicago, the local contact list 220 includes a listing of all the user's friends and Chicago police, fire, and hospital contacts. If the mobile device 210 is taken to Seattle, the local contact list 220 includes a listing of all the user's friends and Seattle police, fire, and hospital contacts.

The user may not have personally requested that the Chicago or Seattle contacts be added to the list. The user may only have requested contacts for "Police," "Fire," and "Hospital" and then carried the device to different location. The server system performs the selection, not the user. This is one distinction between location-specific contacts 218 and the master contact list 226. In some implementations, the master contact list 226 includes contacts that were actively entered by the user or approved by the user (e.g., if the user actively approved someone as a friend on a social network and the social network contact list was synched with the master contact list 226).

In some implementations, the local contact list includes a filtered subset of contacts from the master contact list 226 and a set of location-specific contacts 218 received from the server system 202. For example, the location filter 230 may identify contacts from the master contact list 226 that are associated with the mobile device's location. A contact can be associated with the mobile device's location if a contact is located within a geographic location that includes the mobile device's location. The geographic location can be a diametric distance from the mobile device location or a geographical location (e.g., a city or a state). A contact can be considered within the geographic location if the contact includes a street address that is within the geographic location. A contact can also be considered within the geographic location if the contact includes a phone number that identifies a telephone that is within the geographic location. For example, if the mobile device 210 is located in Vancouver, the location filter 230 may only add to the local contact list 220 contacts that include a street address in British Columbia or contacts that include a telephone number for a telephone that is located in British Columbia.

In some implementations, the settings module 222 modifies and stores settings that impact which contacts are included in the local contact list. For example, the settings module 222 can determine the criteria for filtering contacts from the master contact list 226 to the local contact list 230. The settings can specify that the local contact list 220 should include all of the master contacts, the master contacts that are associated with a location within a certain distance of the mobile device 210 (e.g., 1 mile, 5 miles, 20 miles, or 100 miles), or contacts that are associated with a location within a same geographic location or geographic area as the mobile device (e.g., a sports venue, city, state, or country).

Figure 4:
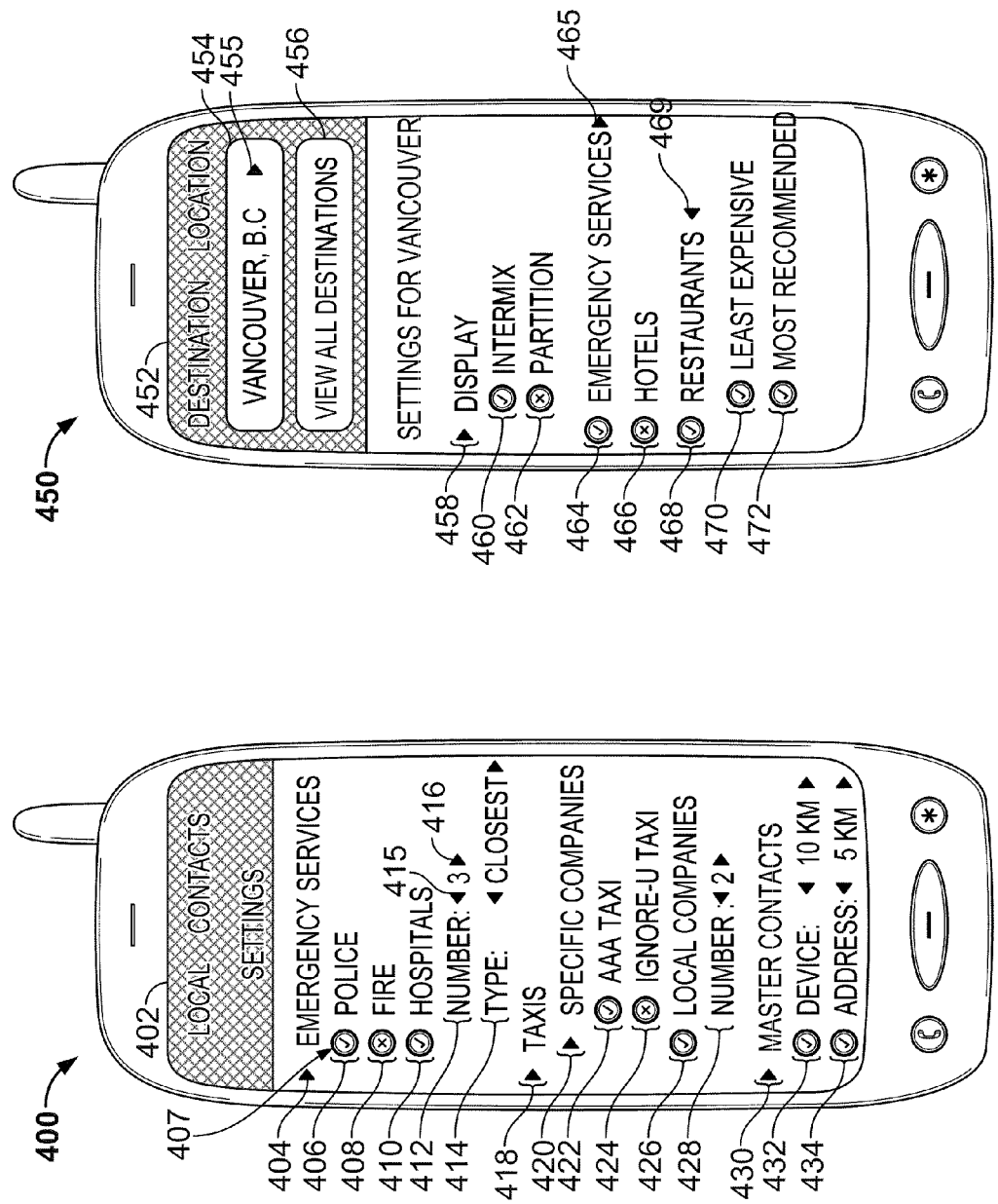
FIGS. 4A-4B are example illustrations of displays on mobile devices for modifying settings that impact the presentation of a local contact list.

In some implementations, the settings module impacts the type of location-specific contacts 218 that the server system 202 provides. For example, the settings module 222 can identify the organizations and service categories that the location-specific contacts identification unit 204 searches. The settings can identify how many contacts should be returned for a particular service category and how geographically close a location associated with a contact must be to the mobile device for inclusion in the local contact list 220. Settings associated with the mobile device 210 are described with more detail in reference to FIGS. 4A-4B.

In some implementations, the local contact list 220 is invoked as a stand-alone application by the mobile device 210. In other words, when the stand-alone application is invoked, only the local contacts 220 are available for viewing on a screen of the mobile device 210. In some implementations, a display of the local contacts 220 are invoked in a contact list application that can display all the contacts in the master contact list 226. For example, a user may be scrolling through all of his contacts and decide that he would rather only see those contacts relevant to his current location. The application displaying all of his contacts may include a "Local" button. Upon invocation of the local button the list of all the contacts may be replaced by the local contact list 220.

The display unit 214 displays the contacts included in the local contact list 220 and screens for modifying the settings that govern the display of the contacts 220. Example screenshots of displays are described with more detail in reference to FIGS. 3A-4B.

FIGS. 3A-3B are example illustrations of mobile devices displaying portions of local contact lists 220. The mobile devices 300 and 350 include screens 302 and 362 that can display a list of contacts. FIG. 3A illustrates a display on a mobile device at a first point in time (t1) and at a second point in time (t2). The contacts displayed on screen 302 include contacts that are drawn both from a master contact list 226 and from a remote server system 202.

In this illustration, the "native" contacts from the master contact list and the location-specific contacts from the server are interspersed in the display of a single contact list. For example, the "Bob Avery," "Betty Boop," "Goodhue Library," and "Mike Johnson" contacts are the contacts from the mobile device's master contact list. The "AAA Taxi" and "Food" contacts are location-specific contacts provided by a remote server.

In some implementations, a location-specific contact is for a specific organization and includes contact information for the nearest organizational office. For example, selection of the "AAA Taxi" contact can display contact information for the "AAA Taxi" franchise in Fargo, the closest city to the telephone 300. If the closest franchise is beyond a threshold distance, the organizational contact may include national contact information or the contact may disappear from display in the local contact list. For example, if the telephone 300 is in Winnipeg and the closest "AAA Taxi" franchise is in Fargo, the telephone 300 may not display a "AAA Taxi" contact 304 or the contact may include a 1-800 number for the national office. In some implementations, the contact for "AAA Taxi" can display contact information for only one local franchise. The "AAA Taxi" contact may be unable to display information for several offices.

In some implementations, the displayed contact list includes a category contact that is a placeholder for a set of related location-specific contacts. For example, selection of the "Food" category contact 310 at time t1 can cause the telephone 300 to trigger the display of location-specific "Food" contacts 334, 336, and 338 at time t2. In this illustration, the expanded list of local food places 340 indicates that "Pizza Shack" 334 is 500 meters away, "Vegetable Hut" 336 is 650 meters away, and "Kebabs Delight" 338 is 700 meters away. Selection of any of the contacts 334, 336, or 338 can display information related to the contact. For example, selection the "Kebab's Delight" contact 338 may include directions to Kebab's Delight, reviews of Kebab's Delight, a telephone number for Kebab's Delight, or a menu for Kebab's Delight.

In some implementations, all the contacts in the master list may be displayed in the displayed contact list. Thus, the displayed contacts that are drawn from the master list of contacts may not be selected based on location information. In other words, the "Bob Avery" contact may be associated with a location on the South Pole and the mobile device 300 may be at the North Pole. Regardless, some of the contacts from the master list that are displayed may coincidentally be associated with a location of the mobile device 300. For example, the mobile device may be geographically located in Goodhue County, Minn. The "Goodhue Library" contact 312 may coincidentally be displayed as one of several contacts from the master contact list. If the mobile device 300 was moved away from Goodhue County, the "Goodhue Library" contact 312 would still display in the contact list. For example, the "Bob Avery" contact 306, the "Betty Boop" contact 308, the "Goodhue Library" contact 312 and the "Mike Johnson" contact 316 are all stored locally in the mobile device 302 or pulled from a remote database that is associated with a user of the device 302.

In some implementations, the displayed contacts that are drawn from the master list of contacts are selected based on location information. For example, the mobile telephone 300 may be located near Goodhue County, and of several hundred contacts, the "Bob Avery," "Betty Boop," "Goodhue County," and "Mike Johnson" contacts are associated with a location in or near Goodhue County. The selection of nearby contacts from the master contact list can be performed by the location filter 230.

In some implementations, as the mobile telephone is moved to different geographical locations, the contacts in the list of location-specific "Food" contacts changes. In some implementations, the contacts for location-specific contacts drawn from a server are displayed in a different style than the contacts that are drawn from the master list. For example, each of the location-specific contacts 304 and 310 include a different border than the non-location-specific contacts 306, 308, 312, and 316. As another example, the "AAA Taxi" contact includes an icon 318 that indicates that the contact content is determined by a remote server system and not by the user. Similarly, the icon 318 can also indicate that the contact is not from the master contact list, but is a location and category-specific contact. As another example, the "Food" category contact 310 includes an arrow 320 that indicates that the parent contact will expand upon user selection. In some implementations, an appearance of the contact list itself changes when contacts that are not from the master contact list are added. For example, a shading of all the contacts or the background may change color.

FIG. 3B illustrates a display of a bifurcated contact list on a screen of a mobile device. The bifurcated contact list includes a "Local Contacts" portion 364 and an "Original Contacts" portion 366. The Local Contacts portion includes a grouping of contacts that are associated with a location of the mobile device 350. Some of the local contacts can be filtered from the list of original contacts 366. Other local contacts can be provided by a search engine system.

As an illustration, the telephone 350 is located within "Orlando, Fla.," as indicated by location identifying text 366. The local contacts 368 that are displayed are the contacts that are associated with "Orlando, Fla." For example, a "Bob Avery" contact 370 is associated with a location 3 kilometers from the device 350, a "Dinosaur Burgers" contact 372 is associated with a location 800 meters from the device, a "Betty Boop" contact 374 is associated with a location 40 kilometers from the device, and a "Police" contact 374 is associated with the city of Orlando, Fla.

In the illustration displayed in FIG. 3B, the contacts that are provided by the server system in response to a query are denoted by the double border (i.e., the contacts for "Dinosaur Burgers" and "Police"). The remaining contacts (e.g., the contacts for "Bob Avery" and "Betty Boop") are filtered from the list of original contacts 366 as being the contacts that are nearby. In some implementations, the filtered contacts 370 and 373 are still displayed in the listing of "Original Contacts" 366. In other implementations, the "Bob Avery" and "Betty Boop" contacts are removed from the displayed listing of original contacts 366.

The contacts displayed in FIGS. 3A and 3B are for illustrative purposes. Actual implementations may include additional contacts or different configurations. The screens 302 and 362 may be touch screen display devices that allow a user to scroll down in the list of contacts or up in the list of contacts by swiping a finger across the screen. In some implementations, selection of a contact can provide multiple actions. For example, pressing the contact a single time can provide a default action for the contact (e.g., call the contact or launch a map to an address associated with the contact). A secondary action can be provided, for example, by double-tapping the contact, pressing the contact for an extended time period, swiping across the contact, or pressing a specific portion of the contact. The secondary action can provide a different default action, can provide detailed information on the contact, or can allow editing the contact.

FIGS. 4A-4B are example illustrations of displays on mobile devices for modifying settings that impact the presentation of a local contact list. The settings can modify the operation of the location filter 230, which filters contacts from the master list 220. The settings can also modify the content of the location-specific contacts request 217, which is sent from the mobile device 210 to the server system 202.

FIG. 4A is an example illustration of a mobile device screen 402 for modifying the type of contacts that are displayed on the mobile device in a local contact list 220. The settings displayed in FIG. 4A include several topical categories. For example, an "Emergency Services" category 404 includes a set of services for activation or deactivation by the user of the mobile telephone 400. In this illustration, the "Police" service 406 and "Hospitals" service 410 are activated but the "Fire" service 408 is not. Thus, the mobile telephone's local contact list will include "Police" and "Hospitals" contacts if such emergency services are available at a location of the mobile device. Thus, as the telephone 400 is moved between different locations, the "Police" and "Hospitals" contacts may remain in the local contact list, but the contact information associated with the contacts may change. In this illustration, a user may activate and deactivate particular services by pressing a portion of the screen 402 displaying the button to the left of the service name (e.g., button 407).

In some implementations, users of the telephone 400 may adjust settings for a specific service. For example, the settings screen allows a user to select the number of hospitals 412 displayed in the local contact list and the criteria 414 for determining the type of hospitals to include. In this illustration, the number of hospitals is adjusted by touching the left and right arrows 414 and 416. The criteria for the type of hospitals to include 414 is presently selected as the "Closest" hospitals to the mobile device 400. Other criteria can include the highest ranked hospitals, hospitals with specific specialties (e.g., an emergency room), and the closest hospitals that are open 24 hours a day. In some implementations, user interface items for the number of hospitals 412 and the type of hospitals 414 are only displayed upon a user activation of the hospitals setting 410.

The "Taxis" category of services 418 can include settings for "Specific Companies" 420 and "Local Companies" 426. For example, several specific taxi companies can be available for activation. In this illustration, a user of the mobile device 402 can activate either the "AAA Taxi" company 422 or the "Ignore-U Taxi" company 424. Appropriately, the user has activated "AAA Taxi." Thus, a "AAA Taxi" contact may appear in the device's contact list, but a "Ignore-U Taxi" contact will not. As the user travels with the telephone 402, the "AAA Taxi" icon can appear in the local contact list if the AAA Taxi company has a local franchise that serves a geographical location of the telephone 400. In some implementations, the screen 402 provides an interface for a user to search a list of taxi companies and add specific companies to the list displayed in screen 402.

The "Local Companies" 426 setting allows activation of a feature that adds local taxi companies to the local contact list. For example, the screen 402 displays selection of settings that activate display of two local taxi companies in addition to the specific taxi companies 420. As an illustration, when the mobile telephone 400 is in Duluth, Minn., a display of the local contact list may include a "AAA Taxi" contact (due to selection of the specific companies setting 420) and a "Duluth Taxi Company" contact and an "Iron Range Transportation Service" contact (both due to selection of the local companies setting 426).

The local contact settings screen 402 can allow a user of the telephone 400 to modify the filtering of contacts from the master contact list 226. For example, the telephone 400 may store a master contact list that includes three-hundred contacts. In this illustration, the telephone 400 is configured so that the displayed local contact list includes contacts from the master list that are associated with an address within five kilometers of the telephone 400 or with a device within ten kilometers of the telephone 400.

In some implementations, as the telephone 400 moves from one location to another, a contact is replaced with a new contact, but appears the same to a user of the telephone 400. For example, as the telephone 400 is moved from Boise to Portland, a "Police" contact that includes Boise information is replaced with a new "Police" contact that includes Portland information. The new and old contacts may appear similar to a user of the telephone 400, but the contact information may be different. In other implementations, the contact remains the same, but the information within the contact is changed. In some implementations, selection of the arrows next to the service categories (e.g., service categories 404 and 418) allow a user to "collapse" the services or settings displayed for the particular category. In some implementations, additional categories of services are displayed for selection by a user (e.g., gas stations, barber shops, bars, pharmacies, etc.).

FIG. 4B is an example illustration of a display on a mobile device for modifying the mobile device's display of destination-specific contacts. Destination-specific settings allow a user to modify the services or companies that are displayed in a local contact list for a particular city. As an illustration, an example businessman Joe is planned to leave on a business trip to San Francisco and then fly immediately to Ledger, Mont. to go fly fishing. Joe may want his telephone's contact list to include a list of Taxi Companies and Hotels in San Francisco and a list of Bait Shops near Ledger. The destination-specific settings displayed in FIG. 4B can allow a user to modify the contacts that are displayed in a local contact list when the telephone 450 is at a particular location.

Modifying destination-specific settings can allow a user to tailor settings to specific geographical locations. In some implementations, the settings are downloaded from a remote server before the telephone is at the geographical location. For example, Joe may modify the settings before leaving on his trip, while in he is Los Angeles. The telephone 450 may download, while in Los Angeles, category-specific contacts associated with San Francisco and Ledger. Thus, when Joe arrives in San Francisco or Ledger, the telephone may already have the taxi, hotel, and bait shop contacts in the telephone. The telephone, however, may only display the stored contacts when in an appropriate geographic location. This type of feature can be advantageous where a destination location does not have cellular service or the roaming rates are expensive. In some implementations, the telephone downloads more than a requested amount of contacts. For example, Joe may only want a list of two hotels in San Francisco. The telephone 450 may download contact information for twenty hotels and only display the two that are closest in proximity to Joe's telephone when he lands in San Francisco.

An interface element labeled "View all Destinations" 456 can enable Joe to view a list of destinations for which Joe has entered destination-specific contact settings, and to modify settings for the destinations. For example, Joe may have entered destination-specific contact settings for Vancouver, San Francisco, Ledger, and Detroit. Selection of the "View all Destinations" interface element 454 can present options that enable Joe to add a additional destinations to the current list of destinations. Destinations can include a geographic location or a geographic area as the mobile device (e.g., a sports venue, city, state, or country).

In some implementations, a geographic location used by a local search engine is the same or approximately the same as a geographic location used in filtering contacts from the master list. For example, when Joe lands in Detroit a local search engine may serve his telephone with a list of Pizza shops within Detroit city limits and the master list of contacts stored in his phone may be filtered to only show those contacts that are within Detroit city limits. In some implementations, a geographic location used by a local search engine is different than the geographic location used in filtering contacts from the master list. For example, when Joe lands in Detroit a local search engine may serve his telephone with only the nearest fast food restaurant and all contacts from his master list that are within a radius of 30 miles from Joe's telephone.

The settings screen 452 displays settings that allow a user to select a type of display 458 of the local contacts. If the user selects "Intermix" 460, the local category-specific contacts will be intermixed with the contacts pulled from the telephone's master list. If the user selects "Partition" 462, the telephone 450 may partition the contacts into two lists, a list of local contacts and a list of master contacts. The local contacts may include contacts from the master list that are near the mobile device 450 and local category-specific contacts that are provided by a server system. In this example, the local and master contacts are displayed in different portions of the same screen (e.g., as displayed in FIG. 3B). The two sets of contacts can also be displayed as separate contact lists. If displayed as separate contact lists, a user of the telephone may not be able to view portions of each list on the telephone screen at the same time.

In the illustration displayed in FIG. 4B, a user has selected to have "Emergency Services" displayed in the contact list when the telephone 450 is in Vancouver, but has not selected "Hotels" 466 for display. The user has selected "Restaurants" 468 and has expanded the Restaurants interface element using an expansion arrow (e.g., arrow 469) to display additional settings. The additional settings include a "Least Expensive" restaurants option 470 and a "Most Recommended" restaurants option 472. In this illustration, both options are activated. Thus, when the telephone 450 is in Vancouver, a list of the least expensive restaurants and the most recommended restaurants will be displayed in a local contact list.

Figure 5:
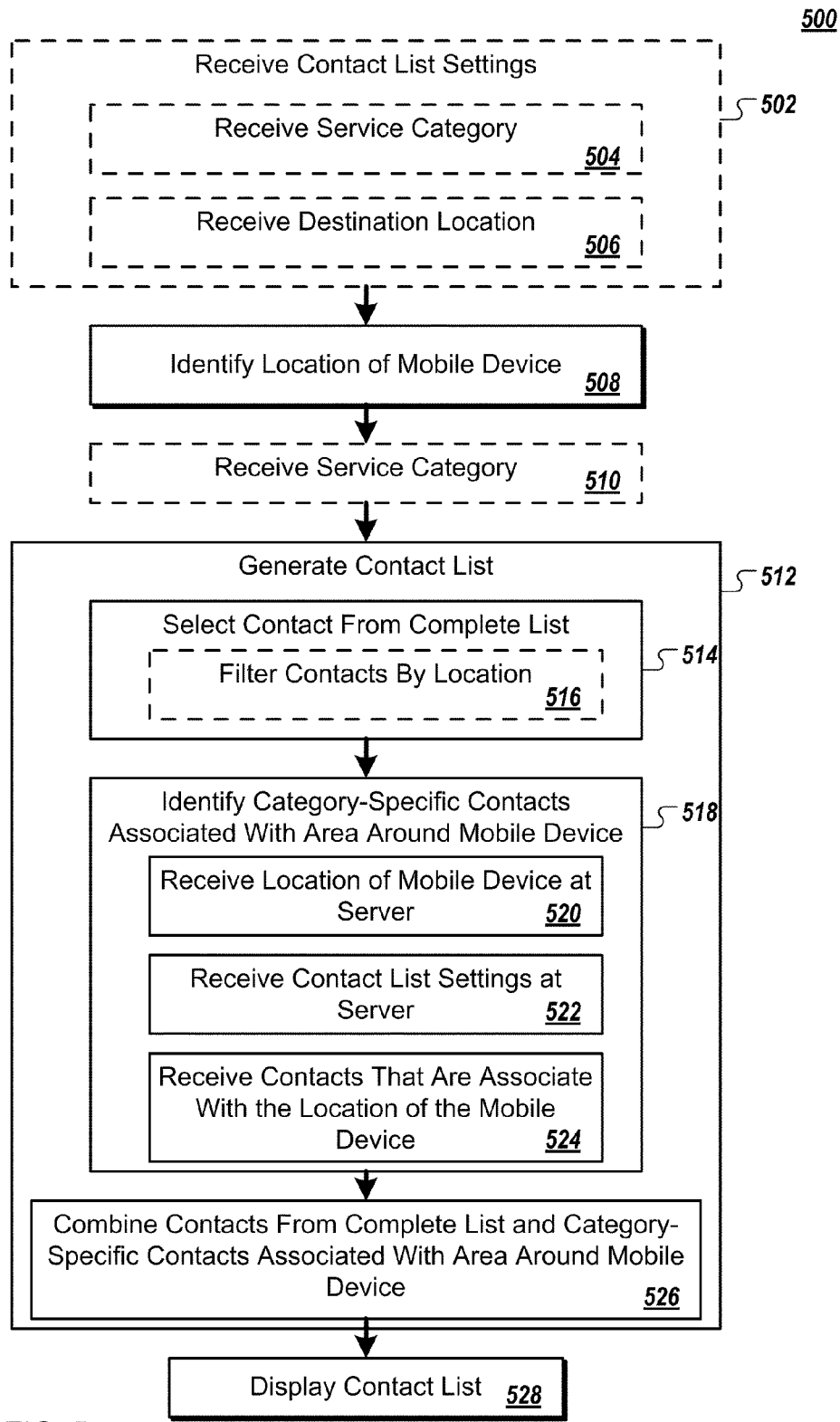
FIG. 5 is a flow chart of an example process 500 for performing modification of dynamic contact lists.

FIG. 5 is a flow chart of an example process 500 for performing modification of dynamic contact lists. Performing process 500 can result in the display of a local contact list. The process 500 can be performed using the devices described in association with FIGS. 1-4B and 6, for example.

At box 502, contact list settings are received. As an example illustration, Billy, an owner of a mobile telephone, navigates to the settings screen of his telephone (e.g., the displays in FIGS. 4A-4B). At the settings screen, Billy is able to select specific service categories. Contacts associated with the service categories and geographically near the telephone can populate the contact list. A service category can be associated with a group of related contacts or businesses. For example, a service category can be an organization that includes several different locations or telephone numbers. A service category can also be a type of organization or a type of service provided by different organizations or individuals. "Hospitals," "WalMart," and "Taxi" can all be different service categories.

In box 504, the selected service categories are received. The service categories can be received on the mobile telephone or can be received at a server system. For example, Billy may enter the service categories using his mobile telephone or may change settings stored on a remote server by accessing a web site with a desktop computer.

In box 506, a destination location is received. For example, Billy may enter information identifying Vancouver as the destination to which the settings defined by the operations in box 504 apply. The interface that Billy uses may be the interface displayed in FIG. 4B. In this example, the settings defined in box 504 may affect the composition of Billy's contact list when Billy's telephone is in Vancouver.

In some implementations, the operations of boxes 502, 504, or 506 are optional. For example, Billy may only enter service categories and not enter destination location information. This example may occur when the service categories entered by Billy apply to all locations. For example, if Billy entered "WalMart" as a service category, the contact list in Billy's telephone may include at least the one closest WalMart, regardless where Billy travels. In another example, Billy does not enter contact list settings at this stage in the process. For example, and as described later, Billy's telephone may first identify a new geographic location before requesting that he define service categories of interest.

In box 508, a location of a mobile device is identified. For example, a GPS system located in Billy's telephone may identify an approximate location of Billy's telephone. In another example, mobile telephone tower triangulation can be used to provide an approximate location for Billy's telephone. In another example, Billy enters a location into the mobile telephone (e.g., using a keypad or by speaking into the telephone). In yet another example, a location of the mobile telephone is probabistically determined by the telephone or by a server system. Billy may have ordered products to an address. The address may be associated with the location of Billy's telephone, either because Billy ordered the product using the telephone or because Billy used his telephone to log into an account that was used to order the product (e.g., Billy accessed an email account that he used on a different computer to order the product).

In box 510, a service category is received. The operations of box 510 may be similar to those of box 504, but performed after the location of the mobile device is identified 508. As an illustration, Billy may fly to Atlanta without having previously entered service categories or destination locations (e.g., as described in connection with boxes 502, 504, and 506). After Billy lands and turns on his mobile telephone, the mobile telephone may identify its location (as described in box 508). The mobile telephone may determine that the location is new. The determination may be performed if the location of the mobile telephone is closer to or in a different "region" than previously. For example, regions can include different portions of cities, cities, metropolitan areas, or countries.

After determining that the mobile telephone is in a new location, Billy's telephone can prompt Billy, asking if he would like to add location-specific contacts to his contact list or form a new contact list of location-specific contacts. If Billy replies affirmatively, Billy's mobile telephone can prompt Billy to identify categories for the location-specific contacts. For example, Billy may be displayed the screen in FIG. 4A. In some implementations, the operations of box 510 are optional. Billy may have defined service categories previously (e.g., as described in association with box 504).

In box 512, a contact list is generated. For example, the contact list can be the contact list that Billy's telephone displays. The contact list can also be stored on his telephone or on a server system, and may never be displayed on the telephone. Generating the contact list includes selecting a set of contacts from a complete list of contacts 514, identifying category-specific contacts associated with a geographic location 518, and combing the two sets of contacts 526.

In box 514, contacts from a complete list of contacts are selected. The complete list of contacts can be the native list of contacts that is stored on the mobile device. For example, the complete list can include the contacts entered by Billy into the telephone. Some of the contacts may not be tagged or associated with a service category in Billy's telephone or a remote server system. In some implementations, the complete list of contacts is stored on a server system or is synchronized with contact lists on server systems that are remote from Billy's telephone.

In box 516, contacts in the complete list are filtered by their locations. For example, the contacts may be filtered so that only the contacts that are near Billy's mobile telephone are included in the contact list that is generated. Billy may have defined settings for the filtering during the operations of box 502. Example modification of filter settings can include the manipulation of interface elements 430, 432 and 434 in FIG. 4A. In some implementations, the operations of box 516 are optional. The selection of contacts may include selecting all contacts from the complete list.

In box 518, category-specific contacts associated with an area around the location of the mobile device are identified. For example, the operations of box 518 can include receiving a location of the mobile device at a server system 520, receiving contact list settings at the server 522, and receiving a list of contacts associated with the location of the mobile device 524.

In box 520, the location of the mobile device is received at a server system. For example, Billy may be in Cancun and have his telephone on him. Billy's telephone may have transmitted location information to a contact generation server system. In some examples, the contact generation server system has stored a location of Billy's telephone.

In box 522, settings for the contacts to be generated by the contact generation server system are received at the server system. The server system may receive the settings from another server (e.g., if Billy entered his settings into a web page using a desktop computer, the settings may be stored at a different server system). In some implementations, Billy's telephone stores the settings and transmits the settings along with the location of the telephone to a server system. The settings can include user-defined service categories.

In box 524, contacts that are associated with the location of the mobile device are received. For example, Billy's telephone may provide to the mobile device a location and a category of services (e.g., a keyword) to a local search engine server system. The local search engine server system can provide responsive results that are associated with the keyword and are near the location. For example, if Billy's telephone transmits the query "Orlando AND Pizza" to the local search engine server system, Billy's telephone may receive from the local search engine a list of names for pizza places in Orlando, associated telephone numbers, and associated locations. In some implementations, a front end server system receives the list of contacts associated with the location from the local search engine server system. The front end server system may provide the contacts to Billy's telephone.

In box 526, the contacts that are selected from the complete list and the contacts that are associated with the location of the mobile device are combined. As an illustration, contacts that are permanently stored in Billy's telephone may be combined with contacts for the pizza places in Orlando. In some implementations, the combination is temporary. In other words, once Billy leaves Orlando, the pizza place contacts are removed from the contact list.

In box 528, the generated contact list is displayed. For example, the contact list may appear on Billy's telephone, as displayed in the illustrations of FIGS. 3A and 3B. In some implementations, the contacts that are received from a server system in response to a local search engine query are displayed interspersed with the contacts that Billy entered into his telephone himself (e.g., all contacts may be arranged alphabetically). In some implementations, a group of contacts associated with the same service category and from the local search engine server system are grouped together and displayed after selection of a label for the group of contacts (e.g., see the "Food" group label 320 and the list of associated contacts 334, 336, and 338). In some implementations, all contacts that are associated with a location of the mobile device are partitioned from contacts that Billy entered into his telephone himself (e.g., see FIG. 3B). In some implementations, the same contact list partitions the contacts received from the search engine server system from all the contact that Billy entered into the telephone. The portion with the contacts from the search engine server system may not include any contacts that Billy entered himself.

Figure 6:
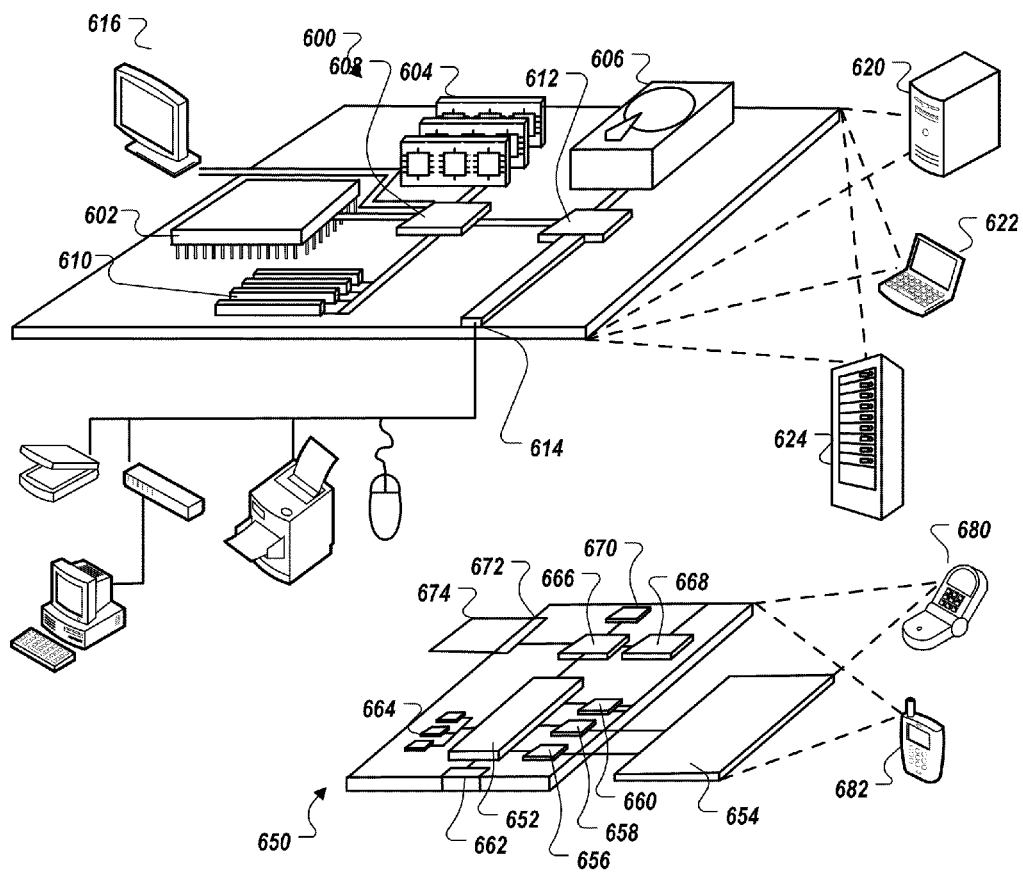
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for creating and propagating promotional information to users of a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for dynamically generating contact lists, the method comprising:
receiving user-input that identifies an organization for which an associated contact is to be included in a local contact list;
identifying, with a computer system, a geographic location of a mobile computing device that is associated with a user;
generating the local contact list by:
selecting, for inclusion in the local contact list, one or more contacts that are from a contact list that is stored for the user and are within a first predetermined geographic region, wherein the local contact list includes the associated contact that identifies the organization;
in response to a determination that a local office of the organization that is closest to the identified geographic location of the mobile computing device is beyond a threshold distance from the identified geographic location of the mobile computing device, causing the associated contact to include national contact information for the organization;
in response to a determination that the local office of the organization that is closest to the identified geographic location of the mobile computing device is not beyond the threshold distance from the identified geographic location of the mobile computing device, causing the associated contact to include contact information for the closest local office of the organization; and
providing the local contact list for display on the mobile computing device.

2. The computer-implemented method of claim 1, further comprising identifying the first geographic region as including the geographic location of the mobile computing device.

3. The computer-implemented method of claim 1, wherein the local contact list is generated automatically in response to a change in geographic location of the mobile computing device.

4. The computer-implemented method of claim 1, wherein the local contact list is generated in response to receiving user-input identifying a projected location of the mobile computing device.

5. The computer-implemented method of claim 4, wherein the local contact list that is generated in response to the received user-input identifying the projected location is provided for display on the mobile computing device in response to the geographic location of the mobile computing device being within the projected location.

6. The computer-implemented method of claim 1, further comprising providing code that permits the user to alternatively select for show the local contact list and the contact list that is stored for the user.

7. The computer-implemented method of claim 1, wherein the geographic location of the mobile computing device is determined using a satellite positioning system.

8. The computer-implemented method of claim 1, wherein the geographic location of the mobile computing device is determined using a position of wireless communication antennas transmitting information to the mobile computing device.

9. The computer-implemented method of claim 1, wherein:
the mobile computing device performs the identification of the geographic location;
the mobile computing device generates the local contact list.

10. The computer-implemented method of claim 1, further comprising selecting, for inclusion in the local contact list, one or more contacts that are not in the contact list that is stored for the user and are within a second predetermined geographic region, wherein the selected one or more contacts that are not in the contact list are associated with a category of services selected by a user of the computing device.

11. The computer-implemented method of claim 1, wherein selecting one or more contacts from within the first predetermined region comprises selecting contacts that include addresses within the first predetermined geographic region.

12. The computer-implemented method of claim 1, wherein selecting one or more contacts from within the first predetermined geographic region comprises selecting contacts that include telephone numbers identifying telephones within the first predetermined geographic region.

13. The computer-implemented method of claim 1, further comprising selecting, for inclusion in the local contact list, one or more contacts that are not in the contact list that is stored for the user and are within a second predetermined geographic region, wherein selecting one or more contacts from within the second predetermined region comprises selecting contacts that include addresses within the first predetermined geographic region.

14. The computer-implemented method of claim 1, further comprising selecting, for inclusion in the local contact list, one or more contacts that are not in the contact list that is stored for the user and are within a second predetermined geographic region, wherein selecting one or more contacts from within the second predetermined region comprises selecting contacts that include telephone numbers identifying telephones within the first predetermined geographic region.

15. The computer-implemented method of claim 1, further comprising selecting, for inclusion in the local contact list, one or more contacts that are not in the contact list that is stored for the user and are within a second predetermined geographic region, wherein the first predetermined geographic region and the second predetermined geographic region are approximately equivalent.

16. The computer-implemented method of claim 1, wherein the first predetermined geographic region is selected by the user.

17. A system for dynamically generating contact lists, the system comprising:
  a mobile device programmed to provide in a particular contact that is in a contact list of multiple contacts and that identifies an organization:
  (i) national contact information of the organization as a consequence of determining that an identified local venue of the organization is beyond a threshold distance from a current geographic location of the mobile device, and
  (ii) contact information of the identified local venue of the organization as a consequence of not determining that the identified local venue of the organization is beyond the threshold distance from the current geographic location of the mobile device;
  a positioning unit in the mobile device to determine the current geographic location of the mobile device; and
  a display device in the mobile device to display the contact list of multiple contacts.

18. The system of claim 17, wherein the contact list of multiple contacts are selected from a contact list that is stored on the mobile device, the selection identifying contacts that are near to the current geographic location, and in distinction to contacts from the contact list that are not near to the current geographic location.

19. A computer-implemented method, comprising:
  receiving user-input that identifies an organization for which an associated contact is to be included in a contact list;
  identifying, with a computer system, a geographic location for a mobile computing device that is associated with a user;
  modifying the associated contact to include national contact information for the organization as a consequence of determining that a particular local office of the organization is beyond a threshold distance from the identified geographic location of the mobile computing device, and modifying the associated contact to include contact information for the particular local office of the organization as a consequence of determining that the particular local office of the organization is not beyond the threshold distance from the identified geographic location of the mobile computing device; and
  providing the associated contact for display as part of a contact list on the mobile computing device.

20. The method of claim 19, wherein the organization is a company.

21. The method of claim 19, wherein the particular office is a franchise of the organization.

22. The method of claim 19, further comprising receiving user selection of the associated contact as it is displayed as part of the contact list, and in response displaying the contact information for the particular local office, wherein the mobile computing device may not be configured to display, for the associated contact, contact information for multiple local offices at a time.

23. A non-transitory computer-readable medium storing instructions that, when executed by one or more computer processors, cause performance of operations, comprising:
  receiving user-input that identifies an organization for which an associated contact is to be included in a contact list;
  identifying, with a computer system, a geographic location for a mobile computing device that is associated with a user;
  modifying the associated contact to include national contact information for the organization as a consequence of determining that a particular local office of the organization is beyond a threshold distance from the identified geographic location of the mobile computing device, and modifying the associated contact to include contact information for the particular local office of the organization as a consequence of determining that the particular local office of the organization is not beyond the threshold distance from the identified geographic location of the mobile computing device; and
  providing the associated contact for display as part of a contact list on the mobile computing device.

24. The computer-readable medium of claim 23, wherein the organization is a company.

25. The computer-readable medium of claim 23, wherein the particular office is a franchise of the organization.

26. The computer-readable medium of claim 23, wherein the operations further comprise receiving user selection of the associated contact as it is displayed as part of the contact list, and in response displaying the contact information for the particular local office, wherein the mobile computing device may not be configured to display, for the associated contact, contact information for multiple local offices at a time.

* * * * *